US009811579B1

(12) United States Patent
Olson

(10) Patent No.: US 9,811,579 B1
(45) Date of Patent: Nov. 7, 2017

(54) DOCUMENT RELATIONAL MAPPING

(71) Applicant: Christopher A. Olson, San Francisco, CA (US)

(72) Inventor: Christopher A. Olson, San Francisco, CA (US)

(73) Assignee: Christopher A. Olson, San Francisco, CA (US)

( * ) Notice: Subject to any disclaimer, the term of this patent is extended or adjusted under 35 U.S.C. 154(b) by 370 days.

(21) Appl. No.: 13/683,694

(22) Filed: Nov. 21, 2012

(51) Int. Cl.
*G06F 17/30* (2006.01)

(52) U.S. Cl.
CPC .............. *G06F 17/30595* (2013.01)

(58) Field of Classification Search
CPC .............. G06F 17/30507; G06F 17/30501
USPC .................. 707/796, 793, 797
See application file for complete search history.

(56) References Cited

U.S. PATENT DOCUMENTS

| 5,729,730 | A  | * | 3/1998  | Wlaschin | G06F 17/30315 |
| 6,581,062 | B1 | * | 6/2003  | Draper   | G06F 17/30569 |
| 6,636,845 | B2 | * | 10/2003 | Chau     | G06F 17/30917 |
| 6,643,633 | B2 |   | 11/2003 | Chau et al. | 707/1 |
| 6,721,727 | B2 |   | 4/2004  | Chau et al. | 707/3 |
| 6,999,956 | B2 | * | 2/2006  | Mullins  | G06F 17/30557 |
| 7,143,104 | B1 | * | 11/2006 | Turba    | G06F 17/30917 707/797 |
| 7,174,327 | B2 |   | 2/2007  | Chau et al. | 707/3 |
| 7,353,222 | B2 |   | 4/2008  | Dodds et al. | 707/3 |
| 7,444,321 | B2 |   | 10/2008 | Cseri et al. | 707/3 |
| 7,529,758 | B2 |   | 5/2009  | Nguyen et al. | 707/100 |
| 7,620,641 | B2 |   | 11/2009 | Nguyen et al. | 707/100 |
| 7,761,484 | B2 |   | 7/2010  | Christensen et al. | 707/807 |
| 8,073,879 | B2 | * | 12/2011 | Meijer   | G06F 9/4435 707/809 |
| 2002/0133497 | A1 | * | 9/2002 | Draper | G06F 17/2205 |
| 2003/0172046 | A1 | * | 9/2003 | Scott | H04L 41/0803 |
| 2005/0187973 | A1 | * | 8/2005 | Brychell | G06F 17/30917 |
| 2006/0136435 | A1 | * | 6/2006 | Nguyen | G06F 17/30917 |
| 2007/0226155 | A1 | * | 9/2007 | Yu | G06Q 30/0283 705/400 |
| 2009/0012974 | A1 | * | 1/2009 | Cassidy | G06F 17/30917 |
| 2009/0019029 | A1 | * | 1/2009 | Tommaney | G06F 17/30471 |
| 2009/0158251 | A1 | * | 6/2009 | Angrish | G06F 17/30914 717/115 |

(Continued)

OTHER PUBLICATIONS

"Introducing JSON" http://www.json.org, printed Nov. 20, 2012, 7 pages.

(Continued)

*Primary Examiner* — Mohammad S Rostami
*Assistant Examiner* — Ahmed Abraham
(74) *Attorney, Agent, or Firm* — Pillsbury Winthrop Shaw Pittman LLP

(57) ABSTRACT

Described is technology to translate between tree-structured documents and electronic storage such as a relational data store. A document may be composed from the data store or decomposed to a data store using a document mapping command. The document mapping command includes follow commands that associate the columns in one table with columns in another table and resolve these associations during composition or decomposition. These follow commands allow for the retrieval of data from the data store and for inserting and/or modifying the data store by way of applying deltas to the data store.

11 Claims, 16 Drawing Sheets

(56) References Cited

U.S. PATENT DOCUMENTS

2010/0257198 A1* 10/2010 Cohen .............. G06F 17/30463
707/770
2012/0303608 A1* 11/2012 Wu .................. G06F 17/30908
707/715

OTHER PUBLICATIONS

Language Guide—Protocol Buffers—Google Developers https://developers.google.com/protocol-buffers/docs/proto, (Apr. 2012), printed Nov. 20, 2012, 13 pages.

Slee, M. et al., "Thrift: Scalable Cross-Language Services Implementation", Facebook, 156 University Ave, Palo Alto, CA {meslee,aditya,marc} @ facebook.com, 8 pages.

Extensible Markup Language (XML), W3C Ubiquitous Web domain, www.w3.org/XML/, printed Nov. 20, 2012, 5 pages.

"XSL Transformations (XSLT) Version 1.0", W3C Recommendation Nov. 16, 1999, www.w3.org/TR/xslt, printed Nov. 20, 2012, 56 pages.

"Don't repeat yourself" Wikipedia, en/Wikipedia.org/wiki/Don%27t_repeat_yourself, printed Nov. 20, 2012, 2 pages.

R.T. Fielding, "Architectural Styles and the Design of Network-based Software Architectures," Ph.D. dissertation, University of California, Irvine, California, USA, 2000, 180 pages.

T. Neward, "The Vietnam of Computer Science", Jun. 28, 2006, blogs.tedneward.com/2006/06/26/The+Vietnam+Of+Computer+Science.aspx, printed Nov. 20, 2012, 9 pages.

"Limits and restrictions for annotated XML schema decomposition", IBM DB2 9.7 Information Center for Linux, UNIX, and Windows, pic.dhe.ibm.com/infocenter/db2luw/v9r7/index.jsp?topic=%2Fcom.ibm.db2.luw.xml.doc%2Fdoc%2FrO . . . 3 pages.

* cited by examiner

Data Store 202

Students

| rowId | id | fullName |
|---|---|---|
| 65 | 555-00-0123 | Carla Johnson |
| B7 | 555-00-3456 | John Smith |
| 2D | 555-00-5678 | Jane Williams |

Classes

| rowId | id | name | room | time |
|---|---|---|---|---|
| 5F | ENG-201 | English 2 | HUM-320 | TR 1:00-2:30 |
| C8 | HIST-321 | Early Ming | ANT-119 | TR 12:00-1:30 |
| E1 | PHYS-101 | Physics 1 | SCI-123A | MWF 9:30-10:30 |
| F0 | PSY-430 | Human Development | HUM-425 | MW 10:00-11:30 |

Enrollments

| rowId | studentRef | courseRef |
|---|---|---|
| 3B | 65 | E1 |
| CC | B7 | E1 |
| 3F | 2D | E1 |
| 78 | B7 | 5F |

FIG. 2B

Document 300

{ name: "John Smith", — 305
  studentId: "555-00-3456", — 310
  classes: [ — 320

{ name: "Physics 1", — 325
      classId: "PHYS-101",
      room: "SCI-123A",
      time: "MWF 9:30-10:30" }, — 335

330

{ name: "English 2",
      classId: "ENG-201",
      room: "HUM-320",
      time: "TR 1:00-2:30" }

Document 400

{ name: "Physics 1", — 405
classId: "PHYS-101", — 410
room: "SCI-123A", — 415
time: "MWF 9:30-10:30", — 420
students: [
    { name: "Carla Johnson", studentId: "555-00-0123" }, — 435
    { name: "John Smith", studentId: "555-00-3456" },
    { name: "Jane Williams", studentId: "555-00-5678" }
] — 430
} — 425

FIG. 4

```
with students {
    studentId: id;
    name: fullName;
    classes: [
        enrollments by key on studentRef
        follow classRef by key {
            classId: classRef.id;
            name: classRef.name;
            room: classRef.room;
            time: classRef.time;
        }
    ];
}
```

FIG. 5B

```
JSON Object 1100 { name: "John Smith",
                   studentId: "555-00-3456",
                   classes: [
                     { name: "Physics 1",
                       classId: "PHYS-101",
                       room: "SCI-123A",
                       time: "MWF 9:30-10:30" },
                     { name: "English 2",
                       classId: "ENG-201",
                       room: "HUM-320",
                       time: "TR 1:00-2:30" }
                   ]
                 }
```

FIG. 11

Notation 1200

$D ::= $ with $N F^* E$ $F ::= $ follow $(N.)^* N$ by $N$ [with write] — 1205

$E ::= \{ ((N: E;)^* \}$
   $\mid [ N \text{ on } N \text{ by } N F^* E ]$
   $\mid N.E$
   $\mid N$

FIG. 12

Abstract Notation 1300

$$U_R ::= \Delta\{(N:U_V)^*\} U_A^*$$
$$U_A ::= \Delta[N; N; N; U_R^*]$$
$$U_V ::= \text{Ref}(N, B, U_R) \quad \text{—1305}$$
$$\quad\quad\quad | \text{ String}$$
$$\quad\quad\quad | \text{ Integer}$$
$$\quad\quad\quad | \text{ null}$$

FIG. 13

DOCUMENT RELATIONAL MAPPING

FIELD OF THE INVENTION

The invention relates to mapping between a document and a relational model.

BACKGROUND OF THE INVENTION

Tree-structured documents are often used to share data because they are easily parseable by a computer and yet are still human-readable. One type of tree-structured document is JSON. Web browsers can store and retrieve objects in JavaScript object notation (JSON), and some web servers provide a JSON interface to web clients. Furthermore mobile applications have adopted JSON as a choice for data exchange, and many programming libraries are available for middleware to handle JSON. Some web services put data in flat files or relational tables, and some put data into distributed key-value stores. The web server then deconstructs the JSON objects and generates commands to update storage as appropriate for the selected system, or generate commands to retrieve data and reconstruct the JSON objects.

Relational modeling is used by many systems. Representing a problem as tables of rows of columns, where some cells are references to rows in other tables, is used for querying data from different points of view. Relational operators for filtering, joining and aggregating data afford the programmer a means to write queries at a high level without over-prescribing mechanisms for segmenting, indexing and caching the data.

One system that can be used for relational modeling is a SQL database. Relational concepts can also be applied to files of records or files of comma separated values (CSV). Tuples can also be stored in a key-value store.

SUMMARY

One aspect of the invention relates to a computer-implemented method for composing a document from a data store. The data store may have a first table and a second table, with the first table having a first column and a first row, and the second table having a second column and a second row. The method is typically implemented in a computer system with one or more physical processors. The method begins by defining a document mapping command that may include a reference to the first table, a follow command that associates the first column with the second column, an object field name, and a column name. The method may also involve creating a root of the document based on the reference to the first table. In some implementations, the method may also involve resolving the follow command to identify the second column as being part of the second table and thereby identifying the second table. The method may include retrieving the second row based on a value in the second column of the second row matching a value in the first column of the first row. In some versions, the method may also include retrieving a column value from a column in the second row, where the column in the second row corresponds to the column name. Lastly, an item may be added to the document, with the item being made up of—in some instances—the object field name and the column value.

In some implementations, resolving the follow command involves associating the first column with the first row by specifying a value in the first column that is a key in the first row. Alternatively, resolving the follow command may involve, in some embodiments, scanning each value in the one or more columns one at a time as part of scanning the first table in whole or part and retrieving, for each value, a row in the one or more rows that has that value as a key.

There may also be implementations where the steps of resolving the follow command, retrieving the second row, retrieving a column value from a column in the second row and adding an item to the document are performed iteratively and/or recursively for each item that corresponds to an element in an array of elements. Alternatively or additionally, in some implementations, the step of resolving the follow command involves resolving a plurality of references to identify a plurality of columns in a plurality of tables.

Another aspect of the invention relates to a computer-implemented method for decomposing a document to update a data store. As described above, the data store may have a first table and a second table, with the first table having a first column and a first row and the second table having a second column and a second row. The method may be implemented in a computer system that has one or more physical processors. The method involves first defining a document mapping command which may include a reference to the first table, a follow command that associates the first column with the second column, an object field name, and a column name. In some implementations, the method may include retrieving an item in the document, with the item including the object field name and a field value. In some versions, the follow command is resolved to identify the second column as being part of the second table, thereby identifying the second table. The method may also include identifying the second row based on a value in a third column of the second row matching the field value. Then the method may include modifying a fourth column of the second row. In some versions, modifying the fourth column may involve updating the fourth column and/or inserting the second row, or alternatively, it may involve deleting the fourth column in the second row or deleting the second row itself. In some implementations, the second column, third column, and/or fourth columns are the same column.

In some implementations, where changes to the data store are accomplished by applying "deltas" (changes), the decomposing method may include creating a context configured for use when applying the delta such that the context describes one or more of the first table, the second table, the first column, the first row, the second table, the second row, and/or the column value.

In some versions, the steps of retrieving an item in the document, resolving the follow command, identifying the second row, and modifying and/or inserting the fourth column are performed iteratively and/or recursively for each item that corresponds to an element in an array of elements. Additionally or alternatively, resolving the follow command may involve resolving a plurality of references to identify a plurality of columns in a plurality of tables.

In some implementations, defining a document mapping command may include compiling the document mapping command.

Another aspect of the invention relates to a system configured to compose a tree-structured document from a data store, such as the data stores described above. In the system there may be a document mapping command which includes a reference to the first table, a follow command that associates the first column with a the second column, an object field name, and a column name. The system may also have one or more processors configured to execute computer program modules. Some example computer program modules are a resolving module, a data store retrieval module, and a document writing module. In some implementations the resolving module may be configured to process the document mapping command, to form a runtime association between the first column and the second column based on the mapping, and to identify the second column as being part of the second table and thereby identify the second table. In some versions, the data store retrieval module may be configured to retrieve the second row and a column value in the second row, where the second row is retrieved based on a value in the second column of the second row matching a value in the first column of the first row. Additionally the column value may be retrieved from a column in the second row based on a name of the column storing the column value corresponding to the column name. The document writing module may be configured to generate a document that includes the object field name and the column value. In some versions, the system also includes a storage frontend configured to provide an interface to store and retrieve the tree-structured document.

Yet another aspect of the invention relates to a system configured to decompose a tree-structured document to update a data store. The data store may be like the data store described above. In some embodiments, the system may include a document mapping command that includes a reference to the first table, a follow command that associates the first column with the second column, an object field name, and a column name. The system may also include one or more processors configured to execute computer program modules. Some of the computer program modules may be a resolving module, a document reading module and a data store modification and insertion module. In some implementations, the resolving module may be configured to process the document mapping command, to form a runtime association between the first column and the second column based on the mapping, and to identify the second column as being part of the second table, thereby identifying the second table. In some versions the document reading module may be configured to read a document that includes the object field name and a field value. And the data store modification and insertion module may be configured to identify the second row based on a value in a first column of the second row matching the field value and further configured to modify and/or insert a second column of the second row.

These and other objects, features, and characteristics of the present invention, as well as the methods of operation and functions of the related aspects of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2B depicts the data store populated with exemplary data;

FIG. 3 depicts an exemplary document that represents a JSON object for a student's class schedule;

FIG. 4 depicts an exemplary document that represents a JSON object for a class roster;

FIG. 5B depicts another exemplary document mapping command;

FIG. 11 depicts an example JSON object for a student's schedule, similar to that depicted in FIG. 3;

FIG. 12 shows a notation for an example of an implementation of an extended version of the document mapping command language;

FIG. 13 presents new deltas in an abstract notation; and

DETAILED DESCRIPTION

Figure 1:
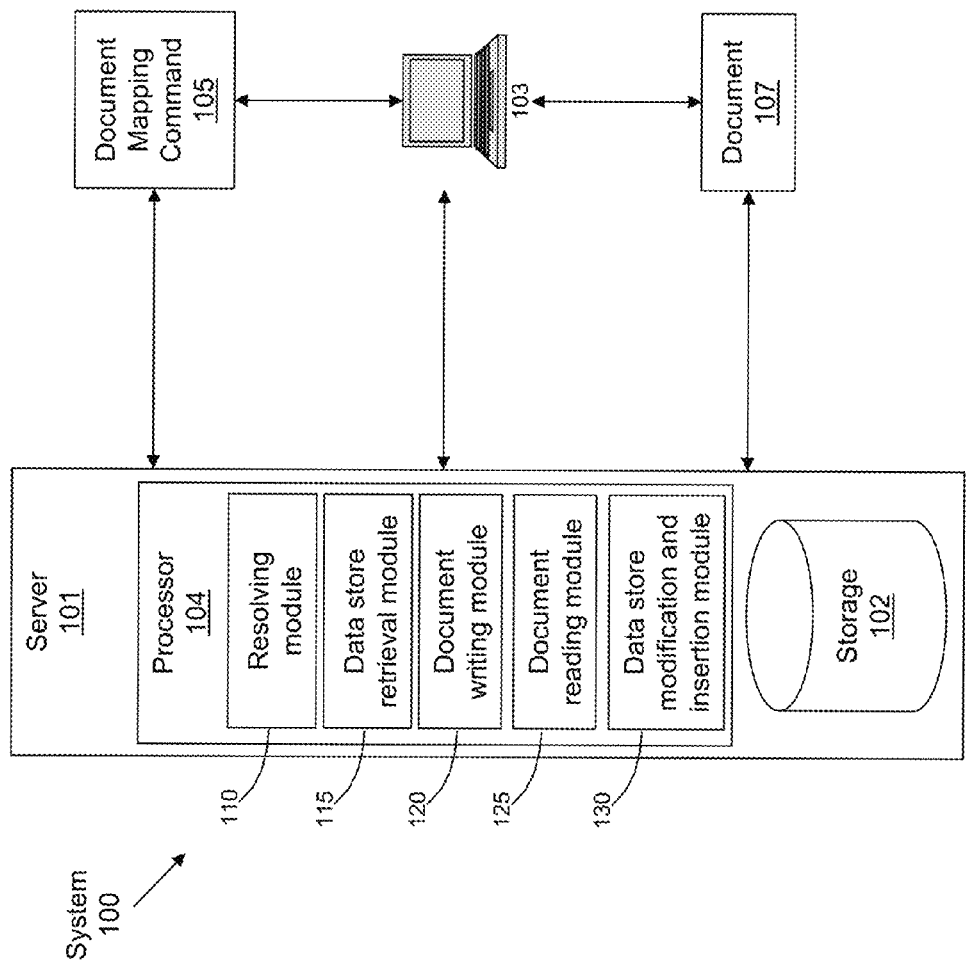
FIG. 1 illustrates a system configured to compose a tree-structured document from electronic storage such as a relational data store and to decompose a tree-structured document to update the storage.

FIG. 1 illustrates a system 100 configured to compose a tree-structured document from storage such as a relational data store and to decompose a tree-structured document to update the storage. Although the example used throughout is described in terms of a student registration system, the technology are systems and methods for document composition and decomposition and may be useful for any scenario that involves extracting data from a data store or one that involves writing a document to a data store.

The system 100 may include a server 101, which includes or is in communication with various components that may be used to carry out the invention. Server 101 may include electronic storage 102, one or more processors 104, and/or other components. Server 101 may include communication lines, or ports to enable the exchange of information with a network and/or other computing platforms, e.g., client computer 103. Illustration of Server 101 in FIG. 1 is not intended to be limiting. Server 101 may include a plurality of hardware, software, and/or firmware components operating together to provide the functionality attributed herein to Server 101. For example, Server 101 may be implemented "in the cloud" by a plurality of computing platforms operating together as Server 101.

In some implementations, electronic storage 102, or generally, a "data store 102", is a relational data store. A relational data store may include a number of tables that each have one or more columns and one or more rows. Additionally or alternatively, electronic storage 102 may be a key-value store, e.g., Apache Cassandra or Apache™ Hadoop®, both by the Apache Software Foundation, or Project Voldemort by LinkedIn or it could be a document store, e.g., MongoDB by 10gen, Inc. or Apache CouchDB™ by the Apache Software Foundation. Electronic storage 102 may be electronic storage media that electronically stores information. The electronic storage media of electronic storage 102 may include one or both of system storage that is provided integrally (i.e., substantially non-removable) with system 100 and/or removable storage that is removably connectable to system 100 via, for example, a port (e.g., a USB port, a firewire port, etc.), a network connection, (e.g., a Network Attached Storage or Storage Area Network), or a drive (e.g., a disk drive, etc.). Electronic storage 102 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 102 may store software algorithms, information determined by processor 104, content to be conveyed to users through a display, and/or other information that enables system 100 to function properly. Electronic storage 102 may be a separate component within system 100, or electronic storage 102 may be provided integrally with one or more other components of system 100 (e.g., processor 104, etc.).

Server 101 may include one or more processors 104 configured to execute computer program modules. To compose a document 107 from storage, the computer program modules may include a resolving module 110, a data store retrieval module 115, and a document writing module 120. To decompose a document 107 to update the storage 102, the computer modules may also include a document reading module 125 and a data store modification and insertion module 130. Processor 104 is configured to provide information processing capabilities in system 100. As such, processor 104 may include one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may include a plurality of processing units. These processing units may be physically located within the same device, or processor 104 may represent processing functionality of a plurality of devices operating in coordination. For example, in one embodiment, the functionality attributed below to processor 104 is divided between a first processor provided in a client computer 103 and server 101.

As is shown in FIG. 1, processor 104 may be configured to execute one or more computer program modules. The one or more computer program modules may include one or more of a resolving module 110, a data store retrieval module 115, a document writing module 120, a document reading module 125, a data store modification and insertion module 130, and/or other modules. Processor 104 may be configured to execute modules 110, 115, 120, 125, and/or 130 by software; hardware; firmware; some combination of software, hardware, and/or firmware; and/or other mechanisms for configuring processing capabilities on processor 104.

It should be appreciated that although modules 110, 115, 120, 125, and/or 130 are illustrated in FIG. 1 as being co-located within a single processing unit, in implementations in which processor 104 includes multiple processing units, one or more of modules 110, 115, 120, 125, and/or 130 may be located remotely from the other modules. The description of the functionality provided by the different modules 110, 115, 120, 125, and/or 130 described below is for illustrative purposes, and is not intended to be limiting, as any of modules 110, 115, 120, 125, and/or 130 may provide more or less functionality than is described. For example, one or more of modules 110, 115, 120, 125, and/or 130 may be eliminated, and some or all of its functionality may be provided by other ones of modules 110, 115, 120, 125, and/or 130. As another example, processor 104 may be configured to execute one or more additional modules that may perform some or all of the functionality attributed below to one of modules 110, 115, 120, 125, and/or 130.

The system 100 may include a document mapping command 105. The document mapping command 105 may include a reference to a table in the electronic storage 102, a follow command that associates a column in the table with a column in a second table, an object field name, and a column name. The document 107 may be a tree-structured document. Examples of tree-structured documents are JSON, "Protobuf" by Google, Apache Thrift™ by the Apache Software Foundation, and eXtensible Markup Language (XML) by W3C®. To illustrate the document mapping command 105 and how it and the other modules are used, a student registration system will be used as the example.

Figure 2A:
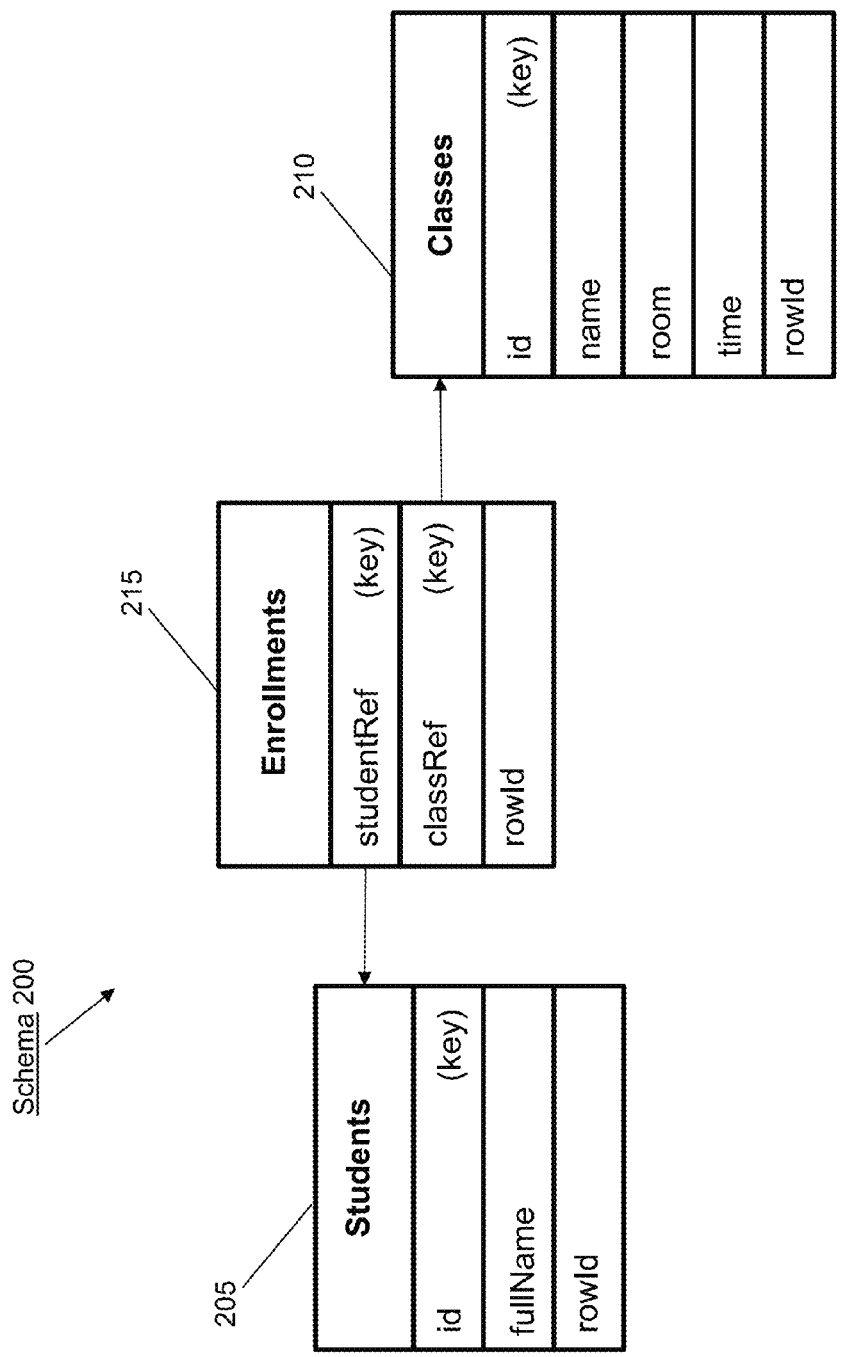
FIG. 2A depicts a schema for exemplary data store for the exemplary student registration system.

FIG. 2A depicts a schema 200 for exemplary data store 202 (see FIG. 2B) for the exemplary student registration system. Data store 202 is one implementation of data store 102 and is shown as a non-limiting example. The data store 202 contains three tables according to schema 200: a Students table 205, a Classes table 210, and an Enrollments table 215. The Enrollments table 215 links the Students table 205 to the Classes table 210. That is, each of the Enrollment table's 215 columns is a reference to a specific row in the other tables 205, 210. Tables 205 and 210 each have one key (both named "key," each on the "id" column). FIG. 2B depicts the data store 202 populated with exemplary data.

There is a difference between the "key" of a table, i.e., which column or columns of the table are designated as the key, the key's name, and the "key value," which is the value in each row/column intersection of the key column(s). No two rows have the same values for those columns that participate in a key, so a key value can be used to identify a single row of the table. As shown in FIG. 2A, in the case of the enrollments table 215, the key comprises the columns studentRef and classRef. Referring to FIG. 2B, the key value for student "Carla Johnson's" enrollment in class "Physics 101" is {555-00-0123, PHYS-101}. The Students table 205 and classes table 210 have a single column each as a key, but the enrollments table has a composite key comprising two columns.

The references in the enrollments table in FIG. 2B are opaque values. In other words, the data is not directly seen or manipulated by a user, e.g., user of client computer 103. In some prior art databases, a reference by key value is implemented. For example the student reference could be implemented by storing the student's id, e.g., 555-00-0123 for Carla Johnson, in the enrollments table itself. In some implementations of the present invention, the primary key of a target table, e.g., the rowId, is used. This allows internal row ids to be manipulated and doing so does not expose those internal rowIds by including them in any document that is generated or to any document that is being decomposed.

FIG. 3 depicts an exemplary document 300 that represents a JSON object, the JSON object in turn representing a student's information and the student's classes. The JSON object (representing a student's schedule) has items, which may be fields or arrays. For example, there are a name field 305, a studentId field 310, and an array 315 of classes. Each class in the array has a name 320, a classId 325, a room 330, and a time 335. A computer application can parse this document and turn it into a JSON object that represents the student and the student's class list. The object can be decomposed and the information can be persisted to a database to create (or update) a student's record and class enrollments. Alternatively, the object can be composed by reading database records and creating the object. The object can then have transformations or edits performed on it, thereby altering aspects of it without having access to the underlying data store. As described above, the record can be persisted to a database to update the database with the transformed object's information.

FIG. 4 depicts an exemplary document 400 that represents a JSON object, the JSON object in turn representing information about a class and the students enrolled in the class. The JSON object has items such as a name field 405, a classId field 410, a room 415, a time 420, and an array 425 of students. Each student in the array has a name 430 and a studentId 435. As with the student JSON object described above, a computer application can parse this document and turn it into a JSON object that represents the class and the students in the class. The object can be decomposed and the information can be persisted to a database to create (or update) a class's information and enrolled students. Alternatively, the object can be composed by reading database records and creating the object. The object can then have transformations or edits performed on it, thereby altering aspects of it without having access to the underlying data store. As described above, the object can be persisted to a database to update the database with the transformed object's information.

Figure 5A:
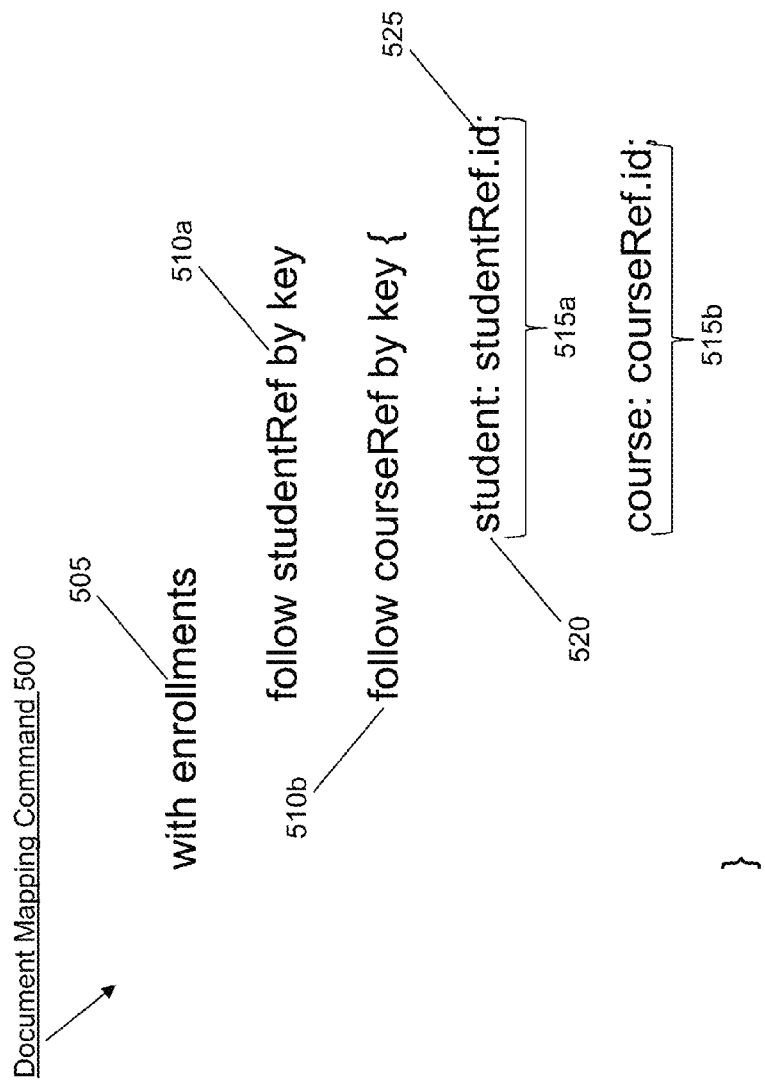
FIG. 5A depicts an exemplary document mapping command.

FIG. 5A depicts an exemplary portion of a document mapping command 500 (see, e.g., document mapping command 105 of FIG. 1, and will be referred to as such moving forward). The portion of the mapping command 105 shown can be used to both compose a tree-structured document and to decompose a tree-structured document. The document mapping command 105 may include a reference to a table 505, a follow command 510a, 510b that associates a first column with a second column, in this case a column in the first table (studentRef in the enrollments table) with a column in the second table (in particular the columns of the key named "key", e.g., the single column rowId in this instance), an association 515a, 515b of an object field name 520 and a column name 525. The mapping command 105 provides a means of following references forward during document composition and a way of resolving key values during document decomposition.

The resolving module 110 (in FIG. 1) may be configured to process the document mapping command 105, to form the association between the first column and the second column based on the mapping, and to identify the second column as being part of the second table, thereby identifying the second table. Continuing with FIG. 5A, the resolving module 110 processes the mapping command 105 into tokens or "fragments" that are used to form associations between columns and tables and specify which columns to retrieve. The parsing of the document mapping command 105—that is extracting items from a text document—may be accomplished using any of a number of known techniques. Once the resolving module 110 has broken the document mapping command 105 into fragments, each fragment is examined and resolved.

The fragment "with enrollments" 505 specifies that a row of the enrollments table serves as the root of the document. When composing a document, the row to be operated on in the enrollments table is identified by the resolving module 110 by one of a variety of means. In some implementations, the row is selected by a key. In some implementations, a reference from another table may be followed. And in some implementations, each row is considered one at a time as part of scanning the table, either in whole or part. When decomposing a document, an existing row is identified (for modifying existing data) by the resolving module 110 or a new row may be designated by the resolving module 110 for inserting data.

Once the row in the enrollments table is identified, the fragment "follow studentRef by key" 510a may be used by the resolving module 110 to locate the appropriate row (based on the key) in the appropriate table (Student). With a given row of the enrollments table, e.g., the row with rowId "3B", the resolving module 110 resolves the specified follow command 510a from the column in the enrollment table (studentRef) to the proper table (Student) based on the relationship (key). Thus, for the row in the enrollment table with a rowId "3B", the studentRef field, with a value of 65, resolves to the Student table row with a rowId of "65". The resolving module 110 performs similar steps for the fragment 510b to determine the proper row in the Classes table.

In some implementations, the data store retrieval module 115 may be configured to retrieve a row from a resolved reference to a table and one or more column values from that row. This row retrieved may be based on a value in the column of the row matching a value in a column of an originally referenced table, e.g., the enrollments table in the present example. Continuing the example, once the appropriate rows are identified in the resolved Student table, the next fragment "student: studentRef.id" is utilized to retrieve the appropriate rows and values, e.g., the data store retrieval module 115 is used to retrieve the referenced rows and values. For example, for the "studentRef.id" fragment, the data store retrieval module 115 gets the value in the id column of the studentRef row, e.g., "555-00-0123" for the 3B row. This value will be used for the student field of the resulting item in the document (discussed below). The data store retrieval module 115 performs similar steps based on the "course: courseRef.id" fragment 515b to get the course id.

In some versions, the document writing module 120 may be configured to generate a document comprising the object field name and a field value that corresponds to a value from a column. Continuing the student registration example, where fragment "student: studentRef.id" 515a is used, the object field name 520 to the left of the colon ("student") becomes the field name of the resulting document item. The sequence of names 523 to the right of the colon ("studentRef") charts a path through columns that reference other rows and finally to a column name 525, ".id", which will resolve to a value in a column. Thus, the document writing module 120 writes the object field name and the field value into the document, i.e., student: "555-00-0123". The document writing module 120 then writes the course id value to the document as well, i.e., course: "PHYS-101". The completed document, for the purposes of the example, looks like that described in paragraph (90).

Referring back to FIG. 1, to decompose a document—that is to receive a document and use it to modify or insert data into the data store—a document reading module 125 may be configured to read a document 107 comprising the object field name and the field value, similar to the document generated by the document writing module 120 described above in reference to FIG. 5. The document reading module 125 parses the document 107 based on one or more delimiters and tokenizes the fragments based on where they are in relation to the one or more delimiters. For example, in one implementation, the entries in the document 107 are separated by semi-colons and the object field name is to the left of a delimiter such as a colon with the field value being to the right of the delimiter.

For decomposition, the resolving module 110 processes and resolves the document mapping command 105 in much the same manner and determines which row will be acted upon. For example, the studentRef and courseRef fields in the enrollments table are resolved by the resolving module 110 into references to other rows from other tables, e.g., Student and Class, respectively, based on the follow declarations. In some implementations, a relational schema, e.g., as shown in FIG. 2A, exists that describes the column references and table keys. In those implementations, the follow declarations augment the schema by naming a specific key to use during resolution since a table may have multiple keys. If the implementation is one where a relational schema does not exist, the follow declaration may name the target table of the reference and the key columns of the rows.

Having named the target table and resolution key, the field values in the document being decomposed are used by the data store modification and insertion module 130 to identify the target rows. As part of the decomposition process, a data store modification and insertion module 130 may be configured to identify the appropriate row based on a value in the column of the row matching the field value in the document, and further configured to modify and/or insert a value in the appropriate column.

For example, the fragment "follow studentRef by key" 510a indicates that to resolve the reference for the studentRef column, the key named "key" of the column's target table is used. As shown in FIG. 2A, the students table has a key named "key", and its single value draws from the column "id". In the document mapping command 105, the object field name 520 ("student") draws from that same column. So given an enrollment record, the value associated with the "student" field (that is the value to the right of the colon associated with the student variable) may be used by the data store modification and insertion module 130 to identify a row in the Students table by the id column. This identifies the target row of the reference for the studentRef column of the enrollments table. A similar operation resolves the reference for the courseRef column.

In some implementations, there may be a storage frontend (not shown) that exposes a RESTful interface to store and retrieve documents. The user may submit an HTTP request to manipulate the object. The URL of that request may be associated to a document mapping command, and that URL would include a key value to identify the root row; the URL might omit the key when adding an object. For example, the above expression could be associated with the URL "/schedule/k", where k is a student id. A web client could make an HTTP POST request to "/schedule", meaning that the identified row is to be a new row, and a web client could make a GET or PUT request to a URL such as "/schedule/555-00-0123" meaning that the identified row is the existing row matching that key "555-00-0123".

Another example of a document mapping command 105 is shown in FIG. 5B that represents a student's schedule. In FIG. 5B, the document mapping command 105 opens by declaring that it starts at the Students table ("with students" 530); that is, the resulting document will be rooted at a single row of the Students table. This document mapping command 105 may be used for composition and decomposition with arrays of children.

To compose a tree-structured document, an item may be formed using the columns from the root row. The studentId field 535 draws from the id column and the name field 540 draws from the fullName column. In some embodiments, the field names that will be used in the document need not match the column names in the data store. The classes field 545 of the record is an array, and its elements draw from the enrollments table. The "on studentRef" fragment 550 means the rows of the enrollments table whose studentRef column references back to the parent student row are selected, and the fragment 550 is used in case two or more columns reference the Students table. For each matching row, an item is written in the document 107 as an element of the array. The fragment "classId: classRef.id" 555 indicates that the classId field draws from the id column of the class row referenced by the classRef column of the Enrollment row under consideration. Similarly, other fields 560, 565, 570 from the Class table are retrieved into the array element.

To decompose a tree-structured document, a root row is specified. The object's studentId field is inserted into or modified to reflect the id field of the root row and its name field is inserted into (or updates as the case may be) the fullName column. Given an element of the array, a match is determined against an existing row in the Enrollments table to decide if a new row should be added or if an existing one should be updated. Moreover the rows in the table that are missing in the array are identified so that those rows may be deleted. The "enrollments by key" fragment indicates how to accomplish this. The Enrollments table has a key named "key", and that key composes two columns: studentRef and classRef. The value for the studentRef column is implied: it is the row of the Students table that is the parent of the array. The "follow classRef by key" fragment indicates how to find the value for the classRef column. The Classes table has a key named "key" and that key is the single column id, which appears in the document 107 as the classId field. The student given by the context is used and the classId field is used to lookup the classRef to match the elements of the array against rows in the Enrollments table. This provides which rows to add, update, or delete.

Figure 6:
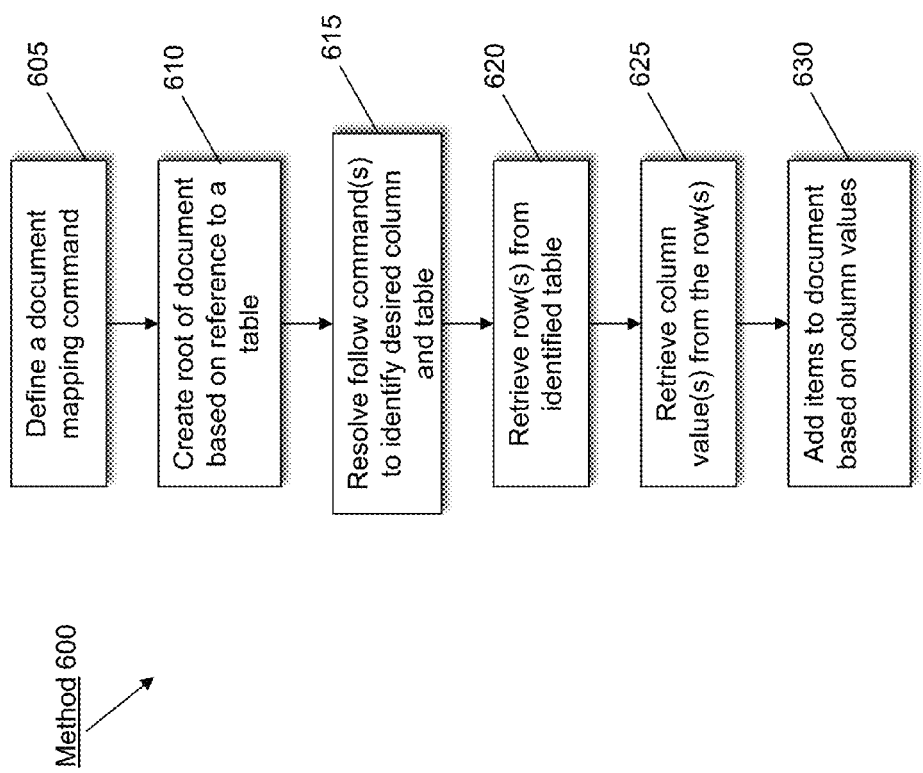
FIG. 6 depicts a computer-implemented method for composing a document from a relational data store.

FIG. 6 depicts a computer-implemented method 600 for composing a document from a data store, such as a relational data store. The data store may include a first table and a second table. The first table may have first column and a first row. The second table may also have a second column and a second row. The method 600 begins at operation 605 where a document mapping command 105 is defined. The document mapping command 105 includes a reference to one of the tables that will be operated on. The mapping may also include a follow command that associates a column in one of the tables with a column in another table—as described above, these columns may have a key relationship such as a foreign key relationship. The mapping may also include an object field name and/or a column name. The method then may include operation 610 which creates a root of the document based on the reference to the table.

The method continues at operation 615 which may involve resolving the follow command to identify the second column as being part of the second table and thereby identifying the second table. Next is operation 620 which may include retrieving the second row. In some of these implementations, which row to retrieve may be based on a value in the second column of the second row matching a value in the first column of the first row.

Then, the method 600 may involve operation 625, which includes retrieving a column value from a column in the second row wherein the column name in the second row corresponds to the object field name. Then, an item may be added to the document at operation 630. The item may include the object field name and the field value.

In some implementations, operation 615 may include associating the first column with the first row by a specifying a value in the first column that is a key in the first row. Alternatively, operation 615 may instead include scanning each of value in the one or more columns one at a time as part of scanning the first table in whole or part and retrieving, for each value, a row in the one or more rows that has that value as a key.

Figure 7:
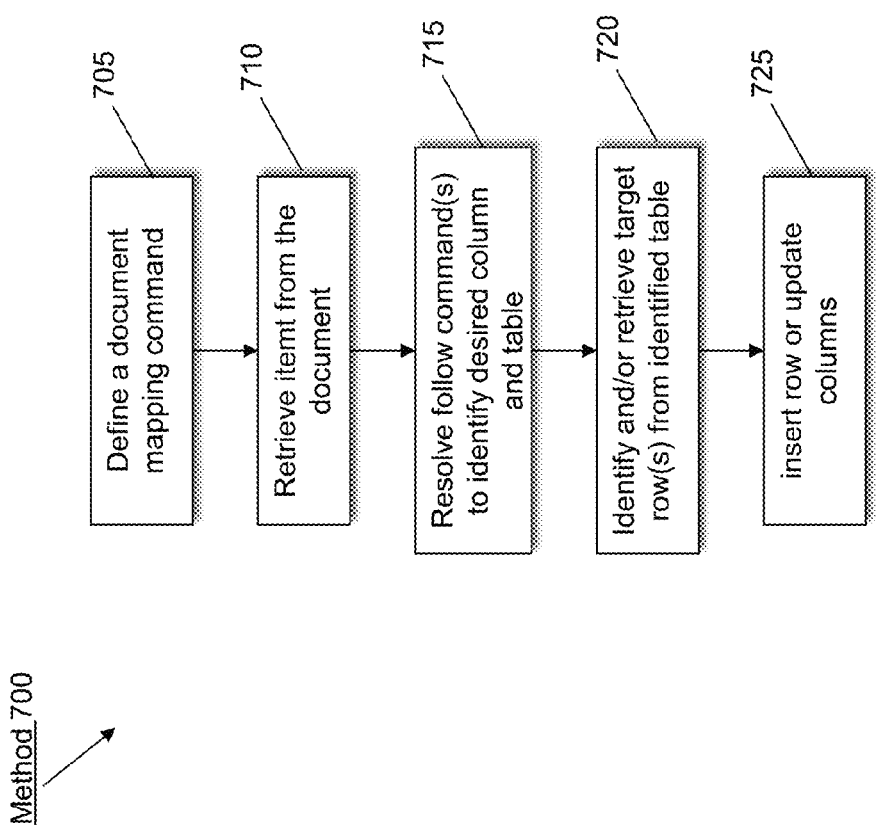
FIG. 7 depicts a computer-implemented method for decomposing a document to update a relational data store.

FIG. 7 depicts a computer-implemented method 700 for decomposing a document to update a data store, such as a relational data store. The data store may include a first table and a second table. The first table may have first column and a first row. The second table may also have a second column and a second row. The method 700 begins at operation 705 where a document mapping command 105 is defined. The document mapping command includes a reference to one of the tables that will be operated on. The mapping may also include a follow command that associates a column in one of the tables with a column in another table—as described above, these columns may have a key relationship such as a foreign key relationship. The mapping may also include an object field name and/or a column name.

The method may include operation 710, which involves retrieving an item in the document 107, the item being, in some implementations, the object field name and a field value. The method 700 then may involve operation 715 which includes resolving any follow commands to identify the second column as being part of the second table and thereby identifying the second table. In some implementations, the second row may be identified and/or retrieved at operation 720 based on a value in a column of the second row matching the field value. Then the first column may be updated with a value from the second column of the second row at operation 725 or a row may be inserted.

Next the syntax of the document mapping command 105 language is given. The following provides a robust way of describing a mapping between documents and data stores.

Document Mapping Command Syntax

Figure 8:
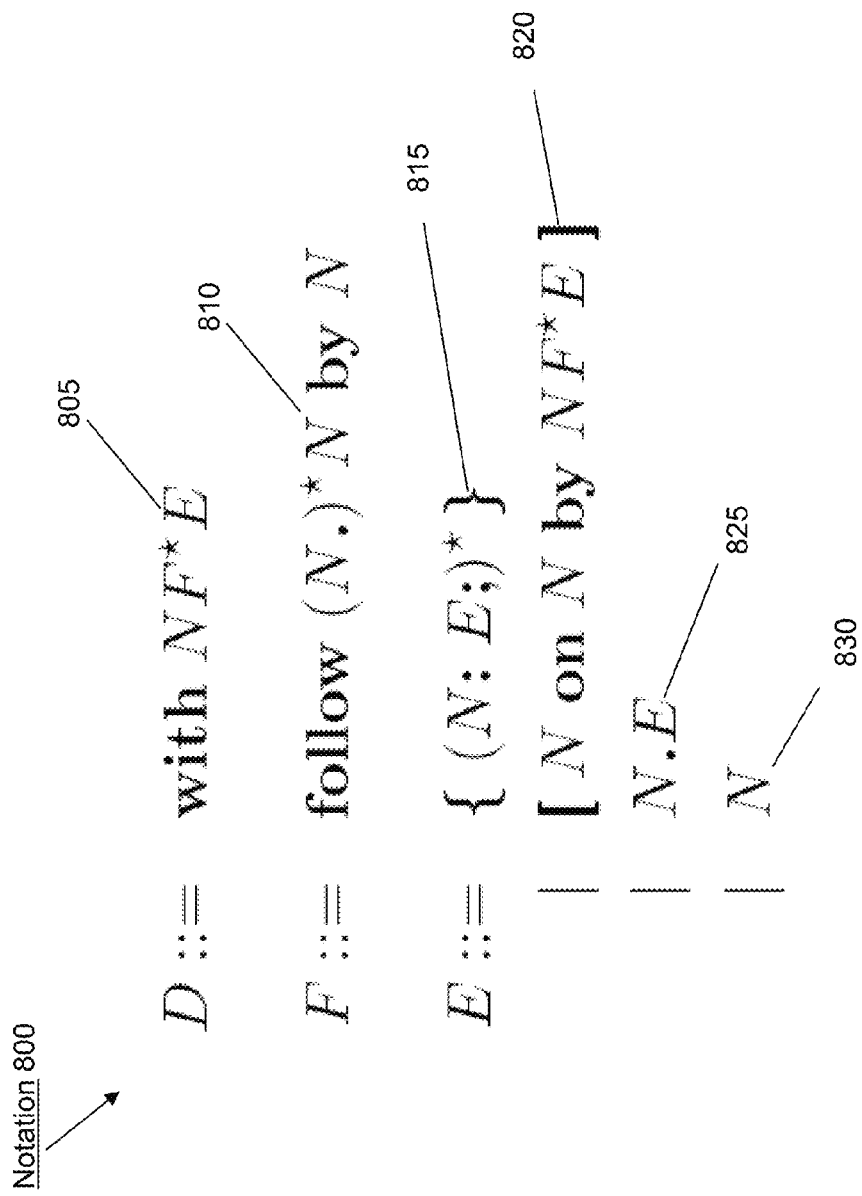
FIG. 8 shows a notation for several productions that may be part of the technology.

FIG. 8 shows a notation 800 for several productions—fragments—that may be resolved by the resolving module 110 as part of the technology described herein, where "N" may be any name, e.g., the names of tables, columns, keys and fields. In some implementations, a production 805 forms the starting point for mapping commands and describes the nature of a document 107. For example, a document mapping command fragment may be "with t fs" where t names the table whose rows can serve as the roots of documents; to work with a document and this expression a single row is identified as the root row in the table t.

Fragment 810 may take one of several forms. It could be, for example, "follow p1.p2 . . . c by k" to indicate that column c, which may be a reference, can be resolved by the resolving module 110 using key k of the table that c references. In the examples for the Enrollment database above, the sequence of names separated by dots p1.p2 . . . was empty, but in general composition and decomposition may follow through a chain of references from one row to the next before arriving at a primitive value. When using such paths, a follow declaration is usually included for each prefix of the path for use during decomposition. In some implementations, a compiler may verify that the mapping command satisfies this requirement before the expression is processed by the resolving module 110.

Production 815 forms the basis of a record or item in a document 107 for some implementations. It contains zero, one, or more field names and expressions. The field name is a single identifier to the left of the colon, and the expression is to the right of the colon.

In some implementations, production 820 is a means of expressing an array in a document 107. The fragment [t on c by k fs e] means that the array draws, via the data store retrieval module 115, from rows of table t such that the column c of t references the parent row, and it means that key k of table t may be used to match elements of the array to rows of the table during decomposition. The array expression e roots its own expression at a child table of the parent row, so the array expression may introduce a new set of follow declarations fs to resolve references from that child table.

In some implementations, production 825 is an expression like c.e to follow the column c, which may be a reference, to the target row and then evaluate e at that row. Production 830 represents the primitive value from the named column. In some implementations, production 825 only follows through one reference at a time, and by recursive application of the productions one can form a path along several references.

Composition

The following provides one example of a notation-based description of the composition process. The process begins with a document and a chosen row:

$$C\lbrack \text{with } t\,fs\ e\rbrack r = C\lbrack e\rbrack (St)r \text{ if } f \in (St)$$

C is used as the name for the composition method, and a fragment of the document mapping command 105 is identified by being between open brackets [ ]. After the composition method is a context, and in some implementations, initially the context may be the selected row. To begin composing a document, storage for the table t is retrieved e.g., by the data store retrieval module, which is represented as (S t). In some implementations, the row r is a row of table t. In other implementations, r is a rowId of table t. The expression e in this case will often be a record, so the following may be used:

$$C\lbrack \{\overline{n{:}e}\}\rbrack tr = \{\overline{n{:}C\lbrack \overline{e}\rbrack tr}\}$$

The entries $\overline{n}$: $\overline{e}$ to the left of the equals indicates that the record expression may have zero, one or more fields. The overbar notation to the right indicates that a field value is composed for each field expression in the record. To compose a record, the subdocument for each subexpression is composed in the context t r.

In implementations that support commands that have an array expression; the pieces of the document 107 are composed for each row of the child table that references the current row:

$$C\lbrack [s \text{ on } c \text{ by } k\,fs\ e]\rbrack tr = \lbrack C\lbrack e\rbrack (Ss)\overline{r'}\rbrack \forall \{r' \in s | r', c \text{ is } r\}$$

In implementations with a path of columns, the references for the leading column are followed through via, e.g., the resolving module 110:

$$C\lbrack c.p\rbrack tr = C\lbrack p\rbrack t.\text{ref}(c)r.\text{ref}(c)$$

The fragment t.ref(c) is used to denote the table referenced by column c of table t, and r.ref(c) is used to denote the row referenced by column c of row r. Thus, by "following through the reference" the context of composition is changed by modifying it to the referenced table and referenced row. When the path is followed to the final column, the tree-structured document value is the value from that column of the current row and is written by the document writing module 125:

$$C \mathbin\Vert c \mathbin\Vert tr = r.c$$

Decomposition

Decomposition of a document 107 may involve many different scenarios, e.g., updating a data store or deleting information from a data store. In some implementations, a function $\epsilon \mathbin\Vert fs \mathbin\Vert$ reduces fs, a sequence of follow declarations, into a form more usable to decomposition. In some versions, this object is referred to as the environment. In some implementations, decomposition is implemented by compiling the document mapping command 105 into a form more suitable for the resolving module 110 to decompose documents, and as one step of compilation it produces and a function or command similar to E, but it then it discards that since it is no longer necessary.

Reducing Follow Declarations

Figure 9:
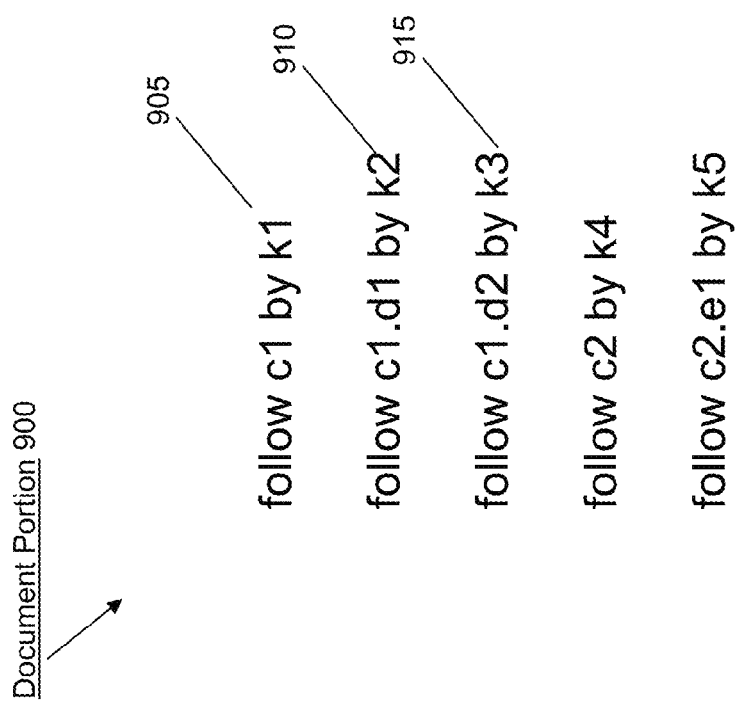
FIG. 9 shows an example of a portion of a document mapping command that may be used to describe a part of a decomposition.

FIG. 9 shows an examplary portion 900 of a document mapping command 105 that may be used to describe a part of a decomposition. The example 900 document mapping command may be used in the context of some table t. In this example 900, table t has a column c1 which is a reference to another table $t_d$, and a column c2 which is a reference to some table $t_e$. Furthermore, table $t_d$ has at least two columns which are references, and table $t_e$ has at least one reference.

As a tree-structured document is decomposed, notation 905 indicates a record field is followed by the resolving module 110 which corresponds to column c1, and key k1 is used for resolving references. To implement this, $\epsilon \mathbin\Vert fs \mathbin\Vert$ produces a mapping, e.g., a hash table, an indexed array, a lookup table, or the like, which provides k1 when given the column name c1. The following denotes finding the key k for the column c:

$$\epsilon \mathbin\Vert fs \mathbin\Vert .key(c) = k$$

As the example 900 is followed through to the record field by the resolving module 110, the keys are found for the columns of the target table. In some implementations, the information for other tables is not needed. For example, as the expression is followed through field for c1, some parts of the original follow fragment can be eliminated and only "follow d1 by k2" 910 and "follow d2 by k3" 915 are needed.

In some implementations, function $\epsilon \mathbin\Vert fs \mathbin\Vert$ of the resolving module 110 discards the irrelevant follow declarations and path prefixes. Such implementations can be denoted by:

$$\epsilon \mathbin\Vert fs \mathbin\Vert .env(c) = fs'$$

In some implementations, the above function does not appear wholly in a single clause for decomposition, but rather is divided across multiple clauses. In those implementations, to change the context, the clauses invoke $\epsilon \mathbin\Vert fs \mathbin\Vert$ at some point, and that result may be bound by the resolving module 110 to an identifier like E at another point (as described above with respect to composition), and the clauses invoke E.key(c) at a later point.

Deltas

In some embodiments, decomposition rules resolved by the resolving module 110 manipulate "deltas," or updates, to the data store. Typically, deltas may be applied to the database by the data store modification and insertion module 130 after decomposition. In some implementations, a delta captures the changes to one row in the database, and the changes to child rows. A delta may supply values for one or more columns of the target row; it may lack values for some columns, and in that case the value may be drawn from defaults given in the relational schema, or from an existing row. It may give as the value of a column either a primitive value or a reference. In the context of deltas, that reference is itself a delta; this is much like the reference of a row is another row. Finally, a delta may carry one or more arrays of rows that reference the parent delta, and the elements of those arrays are themselves deltas.

Figure 10:
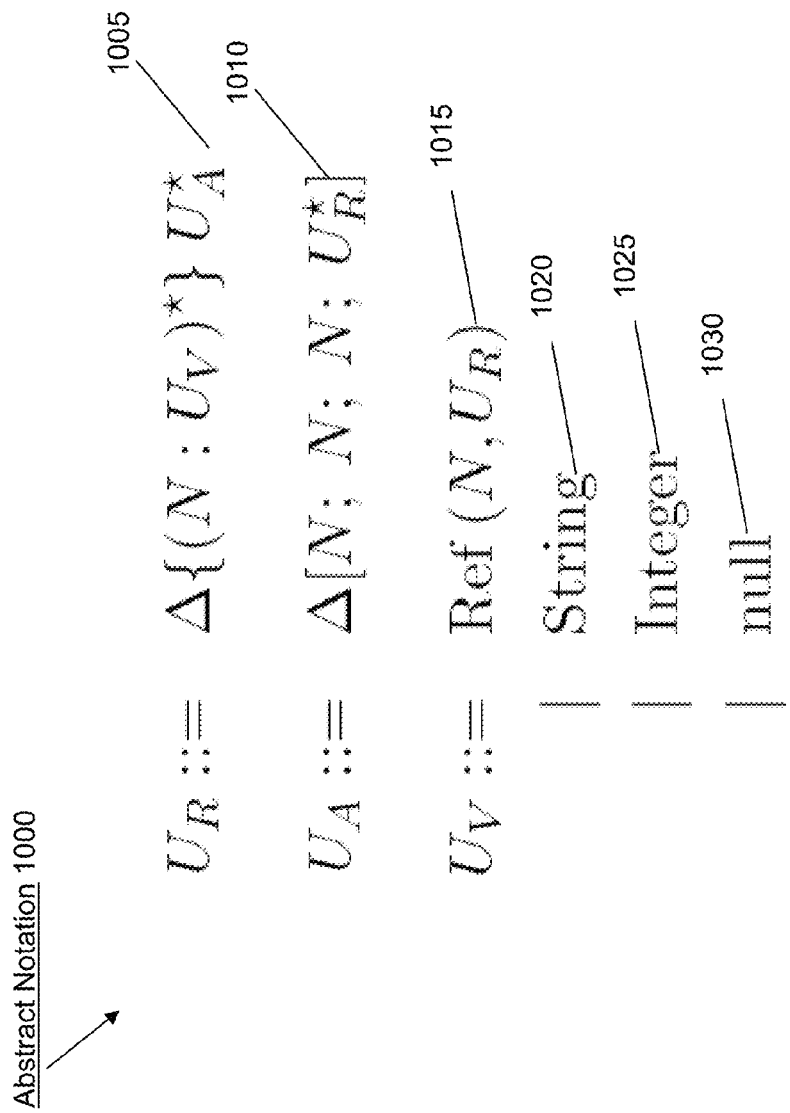
FIG. 10 describes deltas in an abstract notation.

FIG. 10 describes deltas in an abstract notation 1000. As with the syntax for mappings, a production "N" is assumed for names. Production 1005 shows the notation for a delta row $\Delta\{\overline{n}\colon \overline{v}\}\,\overline{a}$. In production 1005 it comprises a list of field names and delta values followed by a list of delta arrays. Production 1010 reveals the form of a delta array, and it carries more than just the elements. For example, the delta array $\Delta[t, \underline{k}, c, \overline{v}]$ indicates to the resolving module 110 elements $\overline{v}$ of this array apply to table t, use the key $\underline{k}$ to resolve key values, where column c is the reference to the parent table. Production 1015 indicates that values in a delta record may be delta references; a reference has the form Ref(k, δ). The key k is used by the resolving module 110 to resolve the key value in δ. Productions 1020, 1025, 1030 indicate that primitive values may also be delta values.

Creating a Delta

In some implementations, creating a delta causes the resolving module 110 to recursively descend the document mapping command 105 carrying along a context. In some versions, the context to create a delta may contain the document mapping command 105, the environment from the follow declarations, the table schema, the value being decomposed, and/or a partially constructed delta. A client 103 may initiate the method with a document mapping command 105 and a value. In some instances, to create the delta only the relational schema is needed; that is, the actual the rows of live data in the data store are not needed—until the delta is applied later. In some embodiments, the tree-structured document 107 is decomposed by the resolving module 110 into deltas on a frontend host, and the deltas are then sent to a backend host that maintains the relational store, e.g., the data store modification and insertion module 130. In those implementations, the backend host may not need knowledge of the source tree-structured document 107 or document mapping command 105.

Starting with an empty delta, the context is expanded, the schema is found for the table, and the environment is computed.

$$D \mathbin\Vert with\ t\ fs\ e \mathbin\Vert v = D \mathbin\Vert e \mathbin\Vert (\epsilon \mathbin\Vert fs \mathbin\Vert)(St)c(\Delta\{\ \})$$

In some implementations, when a record value is decomposed, it may not supply a field value for every field expression in the record expression, and it may supply fields that are not named in the document mapping command 105. For example purposes, only those fields of the value which are named in the expression will be considered. For each such field value, its corresponding field expression is found by field name ($e_m | m = n$). The decomposition is recursively continued by the resolving module 110 with that field expression and field value. This process is repeated for each filtered field, feeding the intermediate delta from the previous iteration into the next one (e.g., foldLeft in the Scala language). The delta therefore may be built by matching fields between the value and the document mapping command 105, and examining each in turn by the resolving module 110.

$$D \mathbin\Vert \{\overline{n\colon e}\} \mathbin\Vert Et\{\overline{m\colon v}\}\delta = \{\overline{m\colon v}\}$$

filter($m \in \overline{n}$)

foldLeft $\delta(\lambda\delta_i.D \mathbin\Vert e_m | m = n \mathbin\Vert E.env(m)tv\delta_i)$ In implementations that support objects with items having an array value, when an array value is decomposed by the resolving module 110, the array expression may be decomposed once for each element in the array, and for each element in the array, the decomposition of the element starts with an empty delta value. In implementations where the array is rooted at a child table, the context may be changed accordingly. The resulting row deltas may be collected into an array delta along with the table, the key to resolve key values, and the column of the child table that references the parent table.

$$D[\![s \text{ on } c \text{ by } k\,fs\,e]\!] \,Et[\overline{v}]\delta = \delta + \Delta[s;k;c;\overline{\delta'}]$$

where $\delta_i' = D[\![e]\!](\epsilon[\![fs]\!])(Ss)v_i(\Delta\{\})$

For the resolving module 110 to handle an expression that is a path of column references, the columns may be inspected one at a time. In implementations where the value in the input document is null, that column is assigned to null in the row delta. If the value is not null, the reference may be followed through the environment, the schema and the delta as described above. In some implementations, when a reference is followed through a delta, either the column has already been assigned to a delta reference, or a fresh delta reference may be created. In some embodiments, it may be an error if the column was already assigned to a delta value other than a delta reference. A new delta reference may be built that adds the new value into that delta reference.

$$D[\![c \cdot e]\!]Et\upsilon\delta = \begin{cases} \delta[c \rightarrow \text{null}]] & \text{if } \upsilon \text{ is null} \\ \delta[c \rightarrow Ref(E \cdot \text{key}(c), \delta')] & \text{if } \upsilon \text{ is not null} \end{cases}$$

where $\delta' = D[\![e]\!] \; E \cdot env(c) \; t \cdot ref(c) \; \upsilon \; \delta \cdot ref(c)$ When the whole path except the last column has been examined, the value to that column of the delta row may be assigned via, e.g., the data store modification and insertion module 130. In some implementations, it may be an error if the column was already assigned; this can occur when the document mapping command 105 derives two record fields from the same table column. In some versions, the document mapping command 105 may be analyzed prior to decomposition to find such errors.

$$D[\![c]\!]Et\upsilon\delta = \delta[c \rightarrow v] \text{ if } v \text{ is primitive or null}$$

The patterns described above may cover only certain cases and skip others. For example, if the supplied document 107 is an array but the available document mapping command 105 is for a record, then there may be nothing to do. In some implementations, such a scenario may raise an error. In some of these implementations, input data may be validated and bad inputs may be rejected. For example, typing semantics may be provided for the document mapping command language and an input document 107 would be checked before decomposing it.

Applying a Delta

In some implementations, decomposition by the resolving module 110 produces a delta that mirrors the relational schema. For example, consider a JSON object that resembles a document for a single enrollment.

{student: "555-00-0123"; course: "PHYS-101";}.

The JSON object may resemble a row from the Enrollments table, except that the student is looked up by student id and the course by course id to obtain references. The decomposition method transforms a tree-structured document like the JSON object into:

Δ{studentRef: Ref(key, Δ{id: "555-00-0123"}); courseRef: Ref(key, Δ{id: "PHYS-101"});}

In implementations which use deltas, the delta provides the update in a format that matches the relational schema: field names in the delta rows match column names in the tables, and a parent delta row provides delta references to child delta rows that again match the schema of the referenced tables. The delta references may also name the key to use for resolving key values in the child delta row.

FIG. 11 shows another exemplary JSON object 1100 for a student's schedule similar to that shown in FIG. 3. This JSON object may resemble one row in the Student table and two rows in the Enrollments table. However, to store this schedule into a data store it may be matched to the relational schema and the key values resolved by the resolving module 110. The following is an example of a delta row that may be produced by one implementation of the decomposition method:

Δ{id: "555-00-3456";
fullName: "John Smith";}
[enrollments; key; studentRef;
Δ{classRef: Ref(key, Δ{id: "PHYS-101";
    name: "Physics 1";
    room: "SCI-123A";
    time: "MWF 9:30-10:30";};}
Δ{classRef: Ref(key, Δ{id: "ENG-201";
    name: "English 2";
    room: "HUM-320";
    time: "TR 1:00-2:30";};}]

This delta row carries the same information as the JSON object, and it matches the relational schema, i.e., fields are of the same name and the same type as the corresponding column, and fields are references to other delta rows when the corresponding column would be a reference to another table row.

The example delta row contains all record fields from the original JSON object. In implementations where the delta may be used to update the row data by, e.g., the data store modification and insertion module 130, this may be useful, but is less useful when only the fields for the key value are needed. In some implementations, non-key columns are removed when they are unnecessary. This may reduce the size of the delta object to save time transmitting it across a network. In some implementations, a filter may be added to remove the unnecessary columns after decomposition.

In the example delta row, it may carry the keys used to resolve references and array elements, and the delta array may also carry information about which column is implied by the parent object. In some embodiments, a given delta row may be used by the resolving module 110 to create new row or to update an existing row. The create and update operations may also be mutually recursive. When creating a row, if the resolving module 110 determines a key of a child array element identifies an existing row, an update operation may be applied. And when updating a row, data may be created if a key of a child element identifies a non-existing row.

Writing Through a Reference

In some implementations, a reference may be written through by the resolving module 110. This may be useful if the user or client computer 103 wants some data created if the data does not exist but does not want the data created in all cases. Continuing the example, if a client user or system 103 attempts to write a tree-structured document 107 for a student's schedule, and the classes array in that schedule lists a classId that is not found in the database, it may not be clear if the class should be created or if an error should be raised. Alternatively, if the client 103 has a tree-structured document 107 that names an existing class but places it in a different room, it may not be clear if the Classes table in the data store should be updated to reflect the new room. To illustrate the issue: a student should not be able to add a class or change the room number since that is the prerogative of the school's administration. However, in other scenarios it makes sense to create new rows and update existing rows. To address this, some embodiments use a flag in the document mapping command language to indicate this.

FIG. 12 shows a notation 1200 for an example of an implementation of the extended version of the document mapping command language. The notation 1200 is similar to notation 800, with the addition of the "with write" flag 1205. In these implementations, the fragment "follow c by k with write" may be interpreted by the resolving module 110 to accomplish either of two things: create new rows when the object identifies a non-existing row, and update an existing row when the object identifies the same row but otherwise has different values. In implementations that use the flag, without the flag, the method may raise an error if the object references a non-existing row, and it may ignore updates to existing rows. When a column specifies the "with write" flag, all of the follow declarations for its prefixes may also include the "with write" flag, otherwise decomposition may ignore the flag. In some versions, a compiler may verify that the document mapping command satisfies this requirement before the document mapping command 105 is used by the resolving module 110.

To include the "with write" functionality, the composition method may stay generally the same as described above, however, the deltas may be modified to take advantage of it. FIG. 13 presents the new deltas in an abstract notation 1300. Notation 1300 is generally the same as notation 1000. Only Production 1305 has changed, that is, there may also be a production "B" of boolean values true and false. The modified Ref carries the write flag with it, and that indicates different behaviors in applying a delta.

When applying a delta, in some implementations there may be a reference that identifies a row that does not exist. In the previously described implementation, this may raise an error, e.g., if a student schedule identified a class that is not offered. In these implementations, the write flag of the Ref is analyzed by the resolving module 110, and if it is true, then the needed row is created. If, however, the reference does identify an existing row, the write flag is still examined by the resolving module 110 because if it is set to true, then the existing row is updated.

In some implementations, the "with write" feature treats all writes similarly. That is, the one flag indicates add a missing row, update an existing row, and delete the old reference when the key selects a new one. In other implementations, there can be multiple flags to indicate this.

Deletion

In some implementations, there is a means for an application to delete a document. In these, deletion may be implemented by the resolving module 110 using triggers to cascade deletion of one row to all other rows that reference the deleted row. However if a document only views a small portion of data that references a row, then it is possible that the triggers could delete data that was not visible when getting that document. Alternatively, the resolving module 110 may facilitate deleting a document 107 by deleting only the rows that can be modified by putting that document. That is, it may find rows that can be reached through follow commands with the write flag, and then deletes all such found rows. For example, in the case of a deleting a student schedule, the rows of enrollments which yield the elements in the classes array would be deleted, as would the corresponding row in the Student table. The resolving module 110 can implement this deletion by extending the deltas with deletion instructions.

Figure 14:
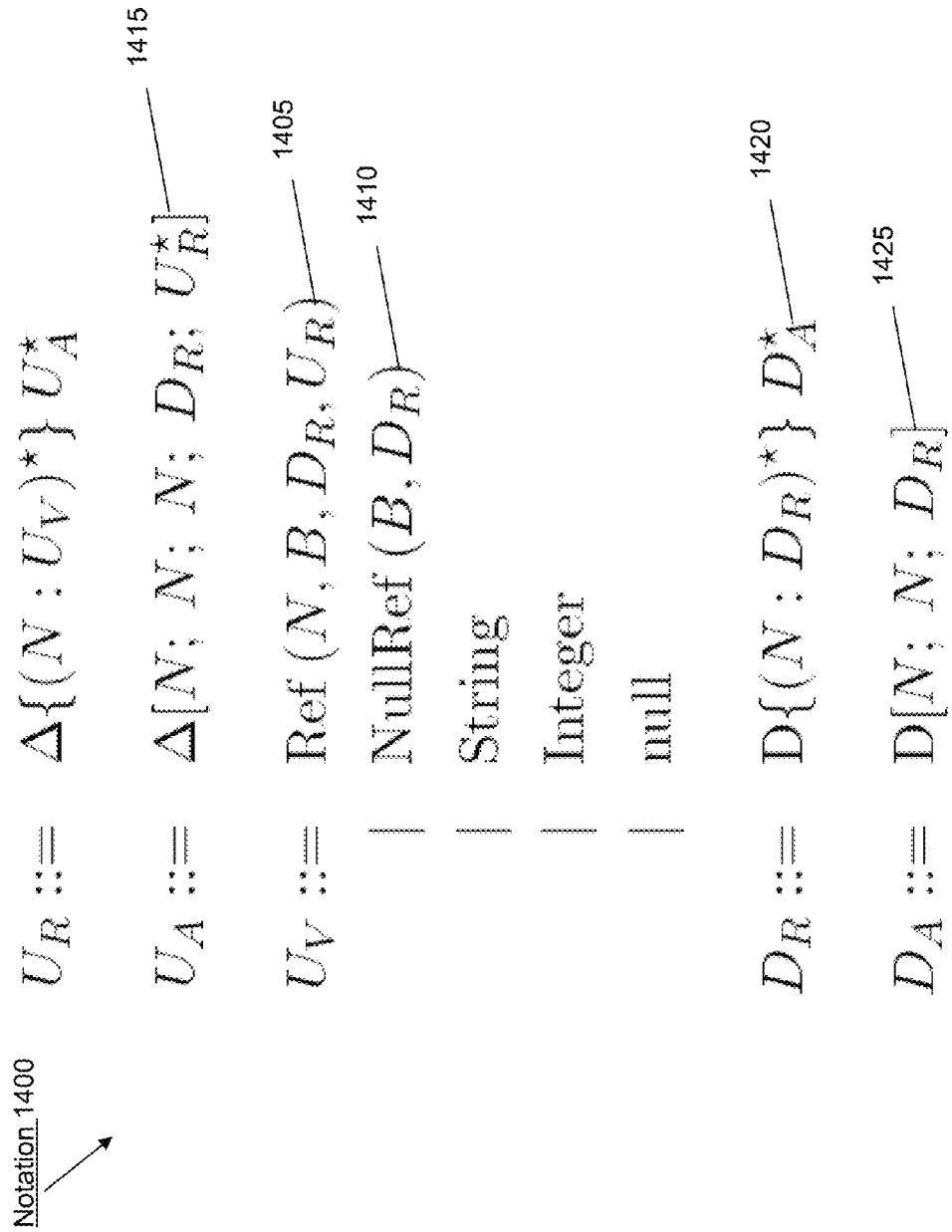
FIG. 14 shows a notation that describes the variants of the deltas, document decomposition and delta application.

In some embodiments, the document mapping command language and document composition described earlier does not need to be modified to implement deletion. FIG. 14 shows a notation 1400 that describes the variants of the deltas, document decomposition and delta application. Production 1405 includes deletion instructions, and production 1410 has been added. The references carry instructions to delete an old row of the target table. Production 1415 is a modified version of production 1010, and adds instructions for the resolving module 110 to delete rows included as elements of an array. Production 1420 yields the instructions for deleting a row, and it lists those columns which are references whose "follow" declaration included the "with write" flag. When deleting a row, the references are followed at the named columns and those rows are deleted as well. Given a deletion instruction like $D\{\bar{n}:\bar{d}\}$, the reference may be followed by the resolving module 110 at each column n and delete that row per the instructions d. Production 1425 yields the instructions for deleting rows that reference the parent row, e.g., for deleting children in an array. Given a deletion instruction like $D[t; c; d]$, table t may be scanned for rows that reference the parent through column c and delete them per the instructions d.

When applying a delta, rows may be deleted as the last step of applying a delta. Internal cross references may become temporarily invalid if the rows are deleted before updating the cross references, but the relational store may not allow the temporary inconsistency. In some implementations, this is accomplished by collecting deletions into a list as the system applies the deltas, and then all deletions in that list are performed at the end. In some embodiments, either a document with no cross references into it is deleted, or the deletion is rejected and the entire document is preserved. Alternatively, in some versions, the document mapping command language is extended and the delta and deletion mechanisms delete only orphans, so that the document is deleted except for those pieces which are the referents of cross references from other documents.

There are also a number of variations on the technology described herein. For example, the document mapping command language may be extended to add features for aggregating child values, expressing derived fields, and supplying defaults for missing fields. In some implementations, there is also a feature for backwards references (the references described above are generally considered "forward references"). A backward reference may be from a column of the child table to the parent row, whereas forward references are from parent to child. In a backward reference, the referencing column may be a key so only one child may be permitted, whereas in an array, the referencing column is not a key and there may be multiple children. This feature may allow a user to describe tables that optionally extend a parent table for special cases.

In some implementations, the language may be modified to support additional features such as sorting array elements, computing derived values in records or aggregating values of arrays, or supplying defaults when data is missing in the tree-structured document. In some embodiments, named document definitions may be used and document references may allow recursive document definition. Additionally, the "with write" flag may be extended to specify different behaviors for adding, updating or deleting. In some embodiments, the decomposition algorithm may be modified to include only key fields in a delta reference. In some implementations, the mechanism of creating and applying deltas may be modified to store arbitrary object fields into selected tables. In some implementations that utilize a SQL database as a data store, there may be a compiler for the document mapping command language that can consider the target relational schema and produce a minimal set of fast SQL queries. Additionally or alternatively, there may be implementations with an analyzer that examines the document mapping commands and recommends secondary indexes. This analyzer may even consider statistics that characterize user behavior as observed in production runs of the application.

Although the invention has been described in detail with respect to a JSON and SQL implementation, the invention is specifically not limited to those embodiments or technologies. Furthermore, although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A computer-implemented method for decomposing a document to update a data store having data organized as tables, the tables comprising a first table and a second table, with the first table comprising a first column and a first row and the second table comprising a second column and a second row, the method being implemented in a computer system comprising one or more physical processors, the method comprising:
    defining, by one or more computers, a document mapping command related to a tree-structured document, the document mapping command comprising a reference to the first table, a follow command that associates the first column with the second column, an object field name, and a column name, wherein the columns have a foreign key relationship;
    creating, by one or more computers, a root of the document based on the reference to the first table;
    retrieving, by one or more computers, an item in the document, the item being identified by the object field name and containing a field value; and
    updating, by one or more computers, based on the field value in the retrieved item, the data store using the document mapping command, wherein an object can have transformations or edits performed on it, such that aspects of it can be altered without access to an underlying data store, wherein the updating of the data store comprises:
        resolving, by one or more computers, the follow command to identify the second column as being part of the second table and thereby identifying the second table, wherein resolving the follow command involves (1) associating the first column with the first row by specifying a value in the first column that is a key in the first row, or (2) scanning multiple field values in one or more columns one at a time as part of scanning the first table in whole or in part and retrieving, for the scanned field values, a row that has a value as a key;
        identifying, by one or more computers, the second row based on a value in a third column of the second row matching the field value;
        modifying, by one or more computers, a fourth column of the second row; and
        using triggers to delete a document, by one or more computers, wherein the triggers are used to cascade deletion of one row to all other rows that reference the deleted row, the triggers configured to delete data that was not visible when getting that document, wherein the steps of retrieving the item in the document, resolving the follow command, identifying the second row, and modifying the fourth column are performed iteratively for each item that corresponds to an element in an array of elements.

2. The method of claim 1 wherein the second column and the third column are the same column.

3. The method of claim 1 wherein the third column and the fourth column are the same column.

4. The method of claim 1 wherein the second column and the fourth column are the same column.

5. The method of claim 1 further comprising creating a context configured for use when applying a delta such that the context describes one or more of the first table, the second table, the first column, the first row, the second table, the second row, and/or the column value.

6. The method of claim 1 wherein resolving the follow command comprises resolving a plurality of references to identify a plurality of columns in a plurality of tables.

7. The method of claim 1 wherein defining a document mapping command comprises compiling the document mapping command.

8. The method of claim 1 wherein modifying the fourth column comprises updating the fourth column and/or inserting the second row.

9. The method of claim 1 wherein modifying the fourth column comprises deleting the fourth column in the second row.

10. The method of claim 1 wherein modifying the fourth column comprises deleting the second row.

11. A system configured to decompose a tree-structured document to update a data store having data organized as tables, the tables comprising a first table comprising a first column and a first row and a second table comprising a second column and a second row, the system comprising:
    a document mapping command related to a tree-structured document, the document mapping command comprising a reference to the first table, a follow command that associates the first column with a the second column, an object field name, and a column name, wherein the columns have a foreign key relationship;
    one or more processors configured by machine-readable instructions to:
    create a root of the document based on the reference to the first table;
    retrieve an item in the document, the item being identified by the object field name and containing a field value; and
    update, based on the field value in the retrieved item, the data store using the document mapping command, wherein an object can have transformations or edits performed on it, such that aspects of it can be altered without access to an underlying data store, wherein the updating of the data store comprises:
        resolving the follow command to identify the second column as being part of the second table and thereby identifying the second table, wherein resolving the follow command involves (1) associating the first column with the first row by specifying a value in the first column that is a key in the first row, or (2) scanning multiple field values in one or more columns one at a time as part of scanning the first table in whole or in part and retrieving, for the scanned field values, a row that has a value as a key;

identifying the second row based on a value in a third column of the second row matching the field value;

modifying a fourth column of the second row; and using triggers to delete a document, wherein the triggers are used to cascade deletion of one row to all other rows that reference the deleted row, the triggers configured to delete data that was not visible when getting that document, wherein the steps of retrieving the item in the document, resolving the follow command, identifying the second row, and modifying the fourth column are performed iteratively for each item that corresponds to an element in an array of elements.

\* \* \* \* \*